(12) United States Patent
Keller et al.

(10) Patent No.: US 6,502,185 B1
(45) Date of Patent: Dec. 31, 2002

(54) PIPELINE ELEMENTS WHICH VERIFY PREDECODE INFORMATION

(75) Inventors: James B. Keller, Palo Alto, CA (US);
Puneet Sharma, Singapore (SG); Keith R. Schakel, San Jose, CA (US);
Francis M. Matus, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/476,936

(22) Filed: Jan. 3, 2000

(51) Int. Cl.[7] ................................ G06F 9/30
(52) U.S. Cl. ..................................... 712/213
(58) Field of Search ......................... 712/213

(56) References Cited

U.S. PATENT DOCUMENTS

| | | | |
|---|---|---|---|
| 5,689,672 A | * 11/1997 | Witt et al. ............. | 711/118 |
| 5,748,978 A | 5/1998 | Narayan et al. ........ | 712/23 |
| 5,819,059 A | * 10/1998 | Tran .................... | 712/210 |
| 5,850,532 A | 12/1998 | Narayan et al. ........ | 712/213 |
| 5,968,163 A | 10/1999 | Narayan et al. ........ | 712/204 |
| 5,970,235 A | * 10/1999 | Witt et al. ............. | 712/213 |
| 6,125,441 A | * 9/2000 | Green ................... | 712/204 |
| 6,189,087 B1 | * 2/2001 | Witt et al. ............. | 712/208 |
| 6,405,303 B1 | * 6/2002 | Miller et al. .......... | 712/204 |

* cited by examiner

*Primary Examiner*—Eric Coleman
(74) *Attorney, Agent, or Firm*—Lawrence J. Merkel

(57) ABSTRACT

A processor includes an instruction cache and a predecode cache which is not actively maintained coherent with the instruction cache. The processor fetches instruction bytes from the instruction cache and predecode information from the predecode cache. Instructions are provided to a plurality of decode units based on the predecode information, and the decode units decode the instructions and verify that the predecode information corresponds to the instructions. More particularly, each decode unit may verify that a valid instruction was decoded, and that the instruction succeeds a preceding instruction decoded by another decode unit. Additionally, other units involved in the instruction processing pipeline stages prior to decode may verify portions of the predecode information. If the predecode information does not correspond to the fetched instructions, the predecode information may be corrected (either by predecoding the instruction bytes or by updating the predecode information, if the update may be determined without predecoding the instruction bytes). In one particular embodiment, the predecode cache may be a line predictor which stores instruction pointers indexed by a portion of the fetch address. The line predictor may thus experience address aliasing, and predecode information may therefore not correspond to the instruction bytes. However, power may be conserved by not storing and comparing the entire fetch address.

22 Claims, 11 Drawing Sheets

PIPELINE ELEMENTS WHICH VERIFY PREDECODE INFORMATION

BACKGROUND OF THE INVENTION

1. Field of the Invention

This invention is related to the field of processors and, more particularly, to predecode mechanisms within processors.

2. Description of the Related Art

Superscalar processors achieve high performance by executing multiple instructions per clock cycle and by choosing the shortest possible clock cycle consistent with the design. As used herein, the term "clock cycle" refers to an interval of time accorded to various stages of an instruction processing pipeline within the processor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

A popular instruction set architecture is the x86 instruction set architecture. Due to the widespread acceptance of the x86 instruction set architecture in the computer industry, superscalar processors designed in accordance with this architecture are becoming increasingly common. The x86 instruction set architecture specifies a variable byte-length instruction set in which different instructions may occupy differing numbers of bytes. For example, the 80386 and 80486 processors allow a particular instruction to occupy a number of bytes between 1 and 15. The number of bytes occupied depends upon the particular instruction as well as various addressing mode options for the instruction.

Because instructions are variable-length, locating instruction boundaries is complicated. The length of a first instruction must be determined prior to locating a second instruction subsequent to the first instruction within an instruction stream. However, the ability to locate multiple instructions within an instruction stream during a particular clock cycle is crucial to superscalar processor operation. As operating frequencies increase (i.e. as clock cycles shorten), it becomes increasingly difficult to locate multiple instructions simultaneously.

Various predecode schemes have been proposed in which a predecoder generates predecode information corresponding to a set of instruction bytes. The predecode information is stored and is fetched when the corresponding set of instruction bytes is fetched. Generally, the predecode information may be used to locate instructions within the set of instruction bytes and/or to quickly identify other attributes of the instructions being fetched. These other attributes may be used to direct further fetching or to direct additional hardware for accelerating the processing of the fetched instructions. Thus, predecoding may be effective for both fixed length and variable length instruction sets.

Typically, the predecode information is kept coherent with the instruction cache storing the instruction bytes, since the processor typically relies on the predecode information to rapidly and correctly process instructions. The predecode information may be stored in the instruction cache with the instruction bytes (and thus is deleted from the cache when the corresponding instruction bytes are deleted), or may be stored in a separate structure which has storage locations in a one-to-one correspondence with cache storage locations. By maintaining coherency with the instruction cache, the predecode information is never erroneously associated with a different set of instruction bytes.

It is desirable to allow for predecode information storage which is not coherent with the instruction cache. For example, it may be desirable to have fewer storage locations for predecode information than the instruction cache has storage locations for cache lines. Alternatively, it may be desirable to organize the predecode information in a different fashion than cache-line based storage. Accordingly, a processor which employs predecode information but does not actively maintain coherency between the predecode cache and the instruction cache is desired.

SUMMARY OF THE INVENTION

The problems outlined above are in large part solved by a processor as described herein. The processor includes an instruction cache and a predecode cache which is not actively maintained coherent with the instruction cache. The processor fetches instruction bytes from the instruction cache and predecode information from the predecode cache. Instructions are provided to a plurality of decode units based on the predecode information, and the decode units decode the instructions and verify that the predecode information corresponds to the instructions. More particularly, each decode unit may verify that a valid instruction was decoded, and that the instruction succeeds a preceding instruction decoded by another decode unit. Additionally, other units involved in the instruction processing pipeline stages prior to decode may verify portions of the predecode information. If the predecode information does not correspond to the fetched instructions, the predecode information may be corrected (either by predecoding the instruction bytes or by updating the predecode information, if the update may be determined without predecoding the instruction bytes). Advantageously, the predecode cache may be designed without attempting to match the instruction cache, and logic for maintaining coherency based on instruction cache updates may not be required.

In one particular embodiment, the predecode cache may be a line predictor which stores instruction pointers indexed by a portion of the fetch address. The line predictor may thus experience address aliasing, and predecode information may therefore not correspond to the instruction bytes. However, power may be conserved by not storing and comparing the entire fetch address.

Broadly speaking, a processor is contemplated. The processor comprises a predecode cache and one or more decode units coupled to receive predecode information from the instruction cache. The predecode cache is configured to store the predecode information, and is further configured to output the predecode information responsive to a fetch address. Each decode unit is further coupled to receive a portion of a plurality of instruction bytes fetched in response to the fetch address, and is configured to decode the portion. The decode units are configured to verify that the predecode information corresponds to the plurality of instruction bytes. Additionally, a computer system is contemplated including the processor and an input/output (I/O) device configured to communicate between the computer system and another computer system to which the I/O device is couplable.

Furthermore, a method is contemplated. Predecode information is fetched from a predecode cache responsive to a fetch address. A plurality of instruction bytes are fetched responsive to the fetch address. The plurality of instruction bytes are decoded. The predecode information is verified as corresponding to the plurality of instruction bytes.

BRIEF DESCRIPTION OF THE DRAWINGS

Other objects and advantages of the invention will become apparent upon reading the following detailed description and upon reference to the accompanying drawings in which.

Figure 1:
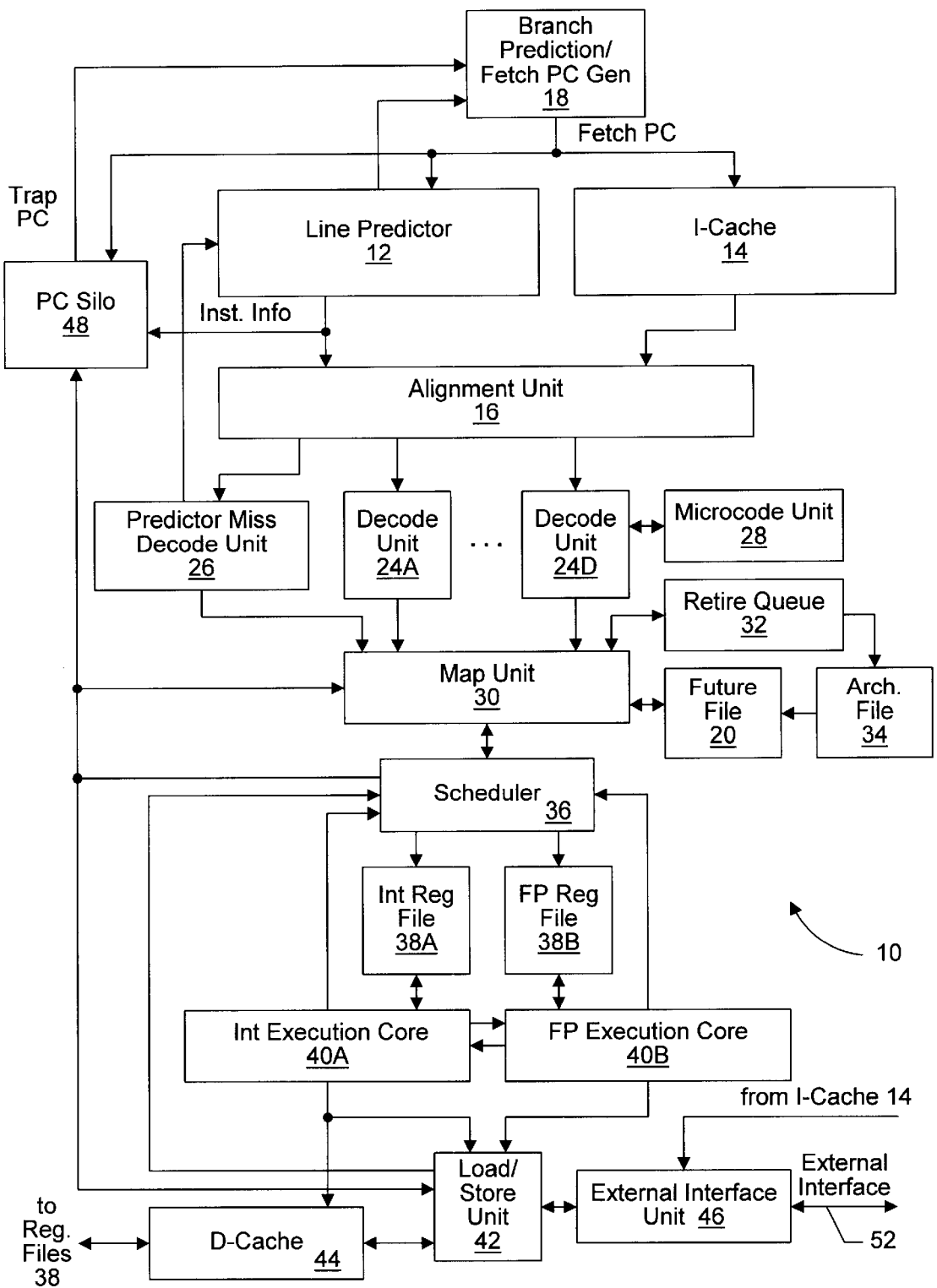
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24D decode the instructions provided thereto, and each decode unit 24A–24D generates information identifying one or more instruction operations (or ROPs) corresponding to the instructions. In one embodiment, each decode unit 24A–24D may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
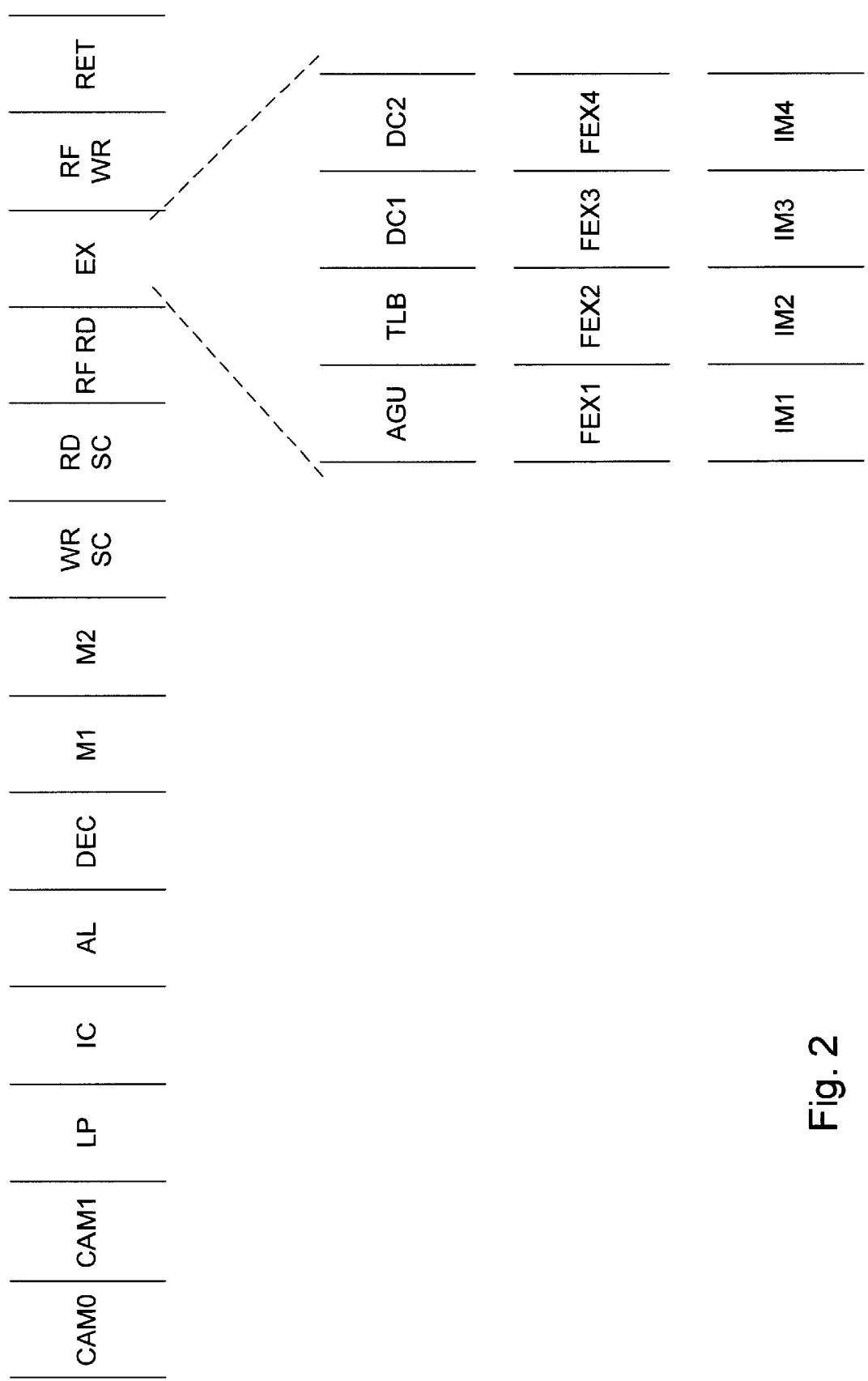
FIG. 2 is a pipeline diagram illustrating pipeline stages of one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operands from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Predecode Verification

Figure 3:
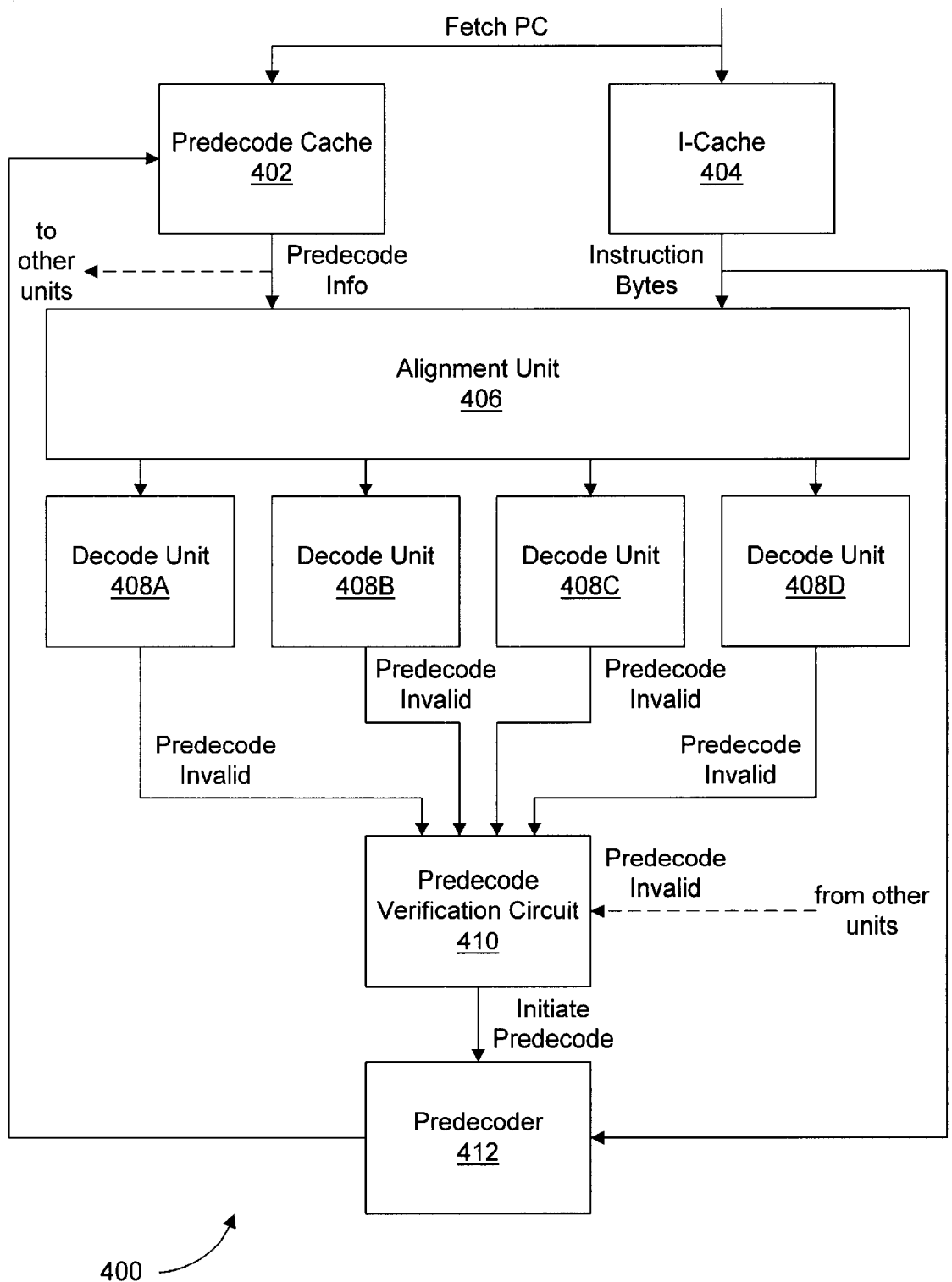
FIG. 3 is a block diagram illustrating one embodiment of a predecode cache, I-cache, alignment unit, decode units, predecode verification circuit, and predecoder.

Turning now to FIG. 3, a block diagram of a generalized apparatus 400 for storing predecode information without maintaining coherency with the instruction cache and for verifying the correctness of the predecode information during instruction processing within the pipeline is shown. Other embodiments are possible and contemplated. The generalized apparatus shown in FIG. 3 may be used in any type of processor, including processor 10 shown in FIG. 1. A more specific implementation employed by one embodiment of processor 10 is described in more detail below. In the embodiment of FIG. 3, apparatus 400 includes a predecode cache 402, an I-cache 404, an alignment unit 406, a plurality of decode units 408A–408D, a predecode verification circuit 410, and a predecoder 412. Predecode cache 402 and I-cache 404 are coupled to receive a fetch address (or fetch PC), and are coupled to alignment unit 406. Alignment unit 406 is coupled to decode units 408A–408D, which are further coupled to predecode verification circuit 410. Predecode verification circuit 410 is optionally coupled to other units involved in the processing of instructions, and is coupled to predecoder 412. Predecoder 412 is coupled to receive instruction bytes from I-cache 404 and to provide predecode information to predecode cache 402.

Generally, I-cache 404 provides instruction bytes in response to the fetch address, and predecode cache 402 provides predecode information. The predecode information may or may not correspond to the instruction bytes (also referred to herein as the predecode information being invalid, even though the predecode information may be valid for a different set of instruction bytes, or the predecode information being incorrect). For example, the predecode cache 402 may include fewer storage locations than the I-cache 404, and hence more than one cache line may map to the same storage location within predecode cache 402. To further reduce storage, the predecode cache 402 may be a tagless table (i.e. no address may be stored to compare to the fetch address to determine if the corresponding predecode information corresponds to the fetched instruction bytes). On the other hand, predecode cache 402 may perform a partial compare of the fetch address to a partial tag stored in the predecode cache 402. Accordingly, predecode data corresponding to an address alias of the fetch address may be fetched.

Alignment unit 406 receives the predecode information and the instruction bytes, and aligns instruction bytes to decode units 408A–408D in response to the predecode information. More particularly, alignment unit 406 presumes that the predecode information corresponds to the instruction bytes and aligns portions of the instruction bytes identified as instructions by the predecode information to the decode units 408A–408D. Additionally, alignment unit 406 may provide the predecode information to decode units 408A–408D. The predecode information used to align a particular instruction to a particular decode unit 408A–408D may be provided to that particular decode unit. Additionally, predecode information which identifies additional attributes of an instruction (beyond the location of the instructions within the instruction bytes) may be provided to the decode unit 408A–408D which receives that instruction. Alternatively, the additional attribute information may be provided to each decode unit 408A–408D, and the decode unit receiving the corresponding instruction may verify the additional attribute information.

Decode units 408A–408D decode the received instruction bytes and provide decoded instruction operations to the subsequent pipeline stages (not shown). Additionally, since it is possible that the predecode information is incorrect for the fetched instruction bytes, decode units 408A–408D verify the predecode information against the instruction bytes received. Predecode information is incorrect if the instruction bytes received by one of the decode units 408A–408D is not a valid instruction. Furthermore, the predecode information may be incorrect if the additional instruction attributes defined by the predecode information (if any) do not correspond to the decoded instructions. Decode units 408A–408D may verify many of the additional attributes as well.

Decode units 408A–408D report the results of verifying the predecode information to predecode verification circuit 410 using the predecode invalid signals illustrated in FIG. 3. Each decode unit 408A–408D asserts the corresponding predecode invalid signal if that decode unit 408A–408D detects one or more inconsistencies between the predecode information and the instruction bytes provided by alignment unit 406 to that decode unit 408A–408D. If a particular decode unit 408A–408D does not detect that the predecode data is incorrect with respect to the instruction bytes received by that particular decode unit 408A–408D, the particular decode unit 408A–408D deasserts the corresponding predecode invalid signal. Accordingly, if one or more of the predecode invalid signals are asserted, predecode verification circuit 410 signals predecoder 412 to predecode the corresponding instruction bytes. Predecoder 412 decodes the instruction bytes and generates predecode information corresponding to the instruction bytes. The generated predecode information is then updated into predecode cache 402, thereby becoming available for the subsequent fetch of the instruction bytes. Predecoder 412 may also be configured to dispatch the instructions within the instruction bytes to subsequent pipeline stages, if desired.

Optionally, one or more other units involved in the processing of instructions may be coupled to receive a portion or all of the predecode information, and may be configured to verify the received predecode information as well. These other units report the results of verifying the received predecode information using predecode invalid signals as well. Alternatively, the other units may correct the predecode information in predecode cache 402 directly, if the correction may be determined without predecoding the instruction bytes.

It is noted that apparatus 400 and the processor in which it is implemented may be pipelined. Accordingly, predecode verification circuit 410 may be configured to indicate to predecoder 412 which of the sets of instruction bytes which are in-flight within the pipeline is to be predecoded, if predecoding may be initiated while the corresponding set of instruction bytes is at different pipeline stages (depending upon which unit detects the incorrect predecode information). Furthermore, if the verification of predecode information is delayed with respect to the completion of decoding of instructions, other pipeline stages may be informed of the determination that the predecode information is invalid, so that those instructions may be invalidated.

As used herein, the term "predecode information" refers to information generated via predecoding of instruction bytes. Predecode information may include information locating instructions within the instruction bytes. For example, the embodiment described below uses instruction pointers to identify instructions within the instruction bytes. Other embodiments may use other methods to locate instructions, such as a start bit and an end bit for each instruction byte. If the start bit is set, the instruction byte is the start of an instruction. If the end bit is set, the instruction byte is the end of an instruction. Yet another embodiment stores an instruction length for each byte, which indicates the length of the instruction if the corresponding byte is the start of an instruction. Any suitable encoding for locating instructions may be used. Predecode information may include additional attributes. An example of additional attributes is described further below. As another example, one embodiment may include the number of ROPs per instruction. Yet another embodiment may include information indicating whether or not each instruction is a microcode instruction. Any suitable additional attributes may be included according to design choice.

As used herein, the term "invalid instruction" refers to a group of instruction bytes which do not form a valid instruction. In other words, the combination of bytes is not defined as an instruction according to the instruction set architecture employed by the processor. As used herein, the term "assert" refers to providing a logically true value for a signal or a bit. A signal or bit may be asserted if it conveys a value indicative of a particular condition. Conversely, a signal or bit may be "deasserted" if it conveys a value indicative of a lack of a particular condition. A signal or bit may be defined to be asserted when it conveys a logical zero value or, conversely, when it conveys a logical one value, and the signal or bit may be defined as deasserted when the opposite logical value is conveyed.

It is noted that, while predecode invalid signals are described as being asserted when predecode information does not correspond to the fetched instruction bytes, predecode valid signals could instead be used. The predecode valid signals would be asserted when the predecode information does correspond to the fetched instruction bytes.

Figure 4:
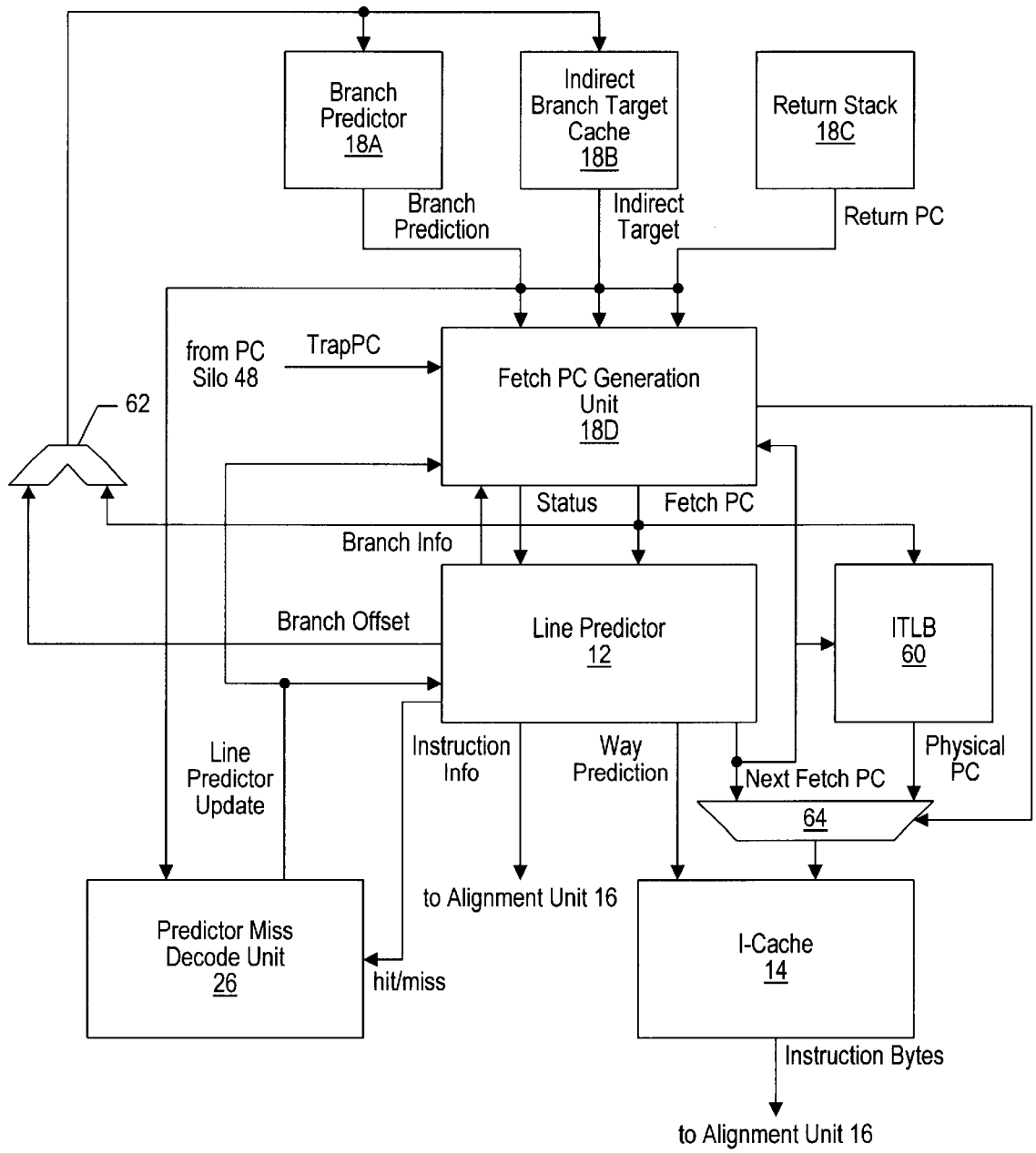
FIG. 4 is a block diagram of one embodiment of a branch prediction/fetch PC generation unit, line predictor, I-cache, and predictor miss decode unit shown in FIG. 1.

Turning now to FIG. 4, a block diagram illustrating one embodiment of branch prediction/fetch PC generation unit 18, line predictor 12, I-cache 14, predictor miss decode unit 26, an instruction TLB (ITLB) 60, an adder 62, and a fetch address mux 64. Other embodiments are possible and contemplated. In the embodiment of FIG. 4, branch prediction/fetch PC generation unit 18 includes a branch predictor 18A, an indirect branch target cache 18B, a return stack 18C, and fetch PC generation unit 18D. Branch predictor 18A and indirect branch target cache 18B are coupled to receive the output of adder 62, and are coupled to fetch PC generation unit 18D and predictor miss decode unit 26. Return stack 18C is coupled to fetch PC generation unit 18D and predictor miss decode unit 26. Fetch PC generation unit 18D is coupled to receive a trap PC from PC silo 48, and is further coupled to ITLB 60, line predictor 12, adder 62, and fetch address mux 64. ITLB 60 is further coupled to fetch address mux 64, which is coupled to I-cache 14. Line predictor 12 is coupled to I-cache 14, predictor miss decode unit 26, ITLB 60, adder 62, and fetch address mux 64.

Figure 5:
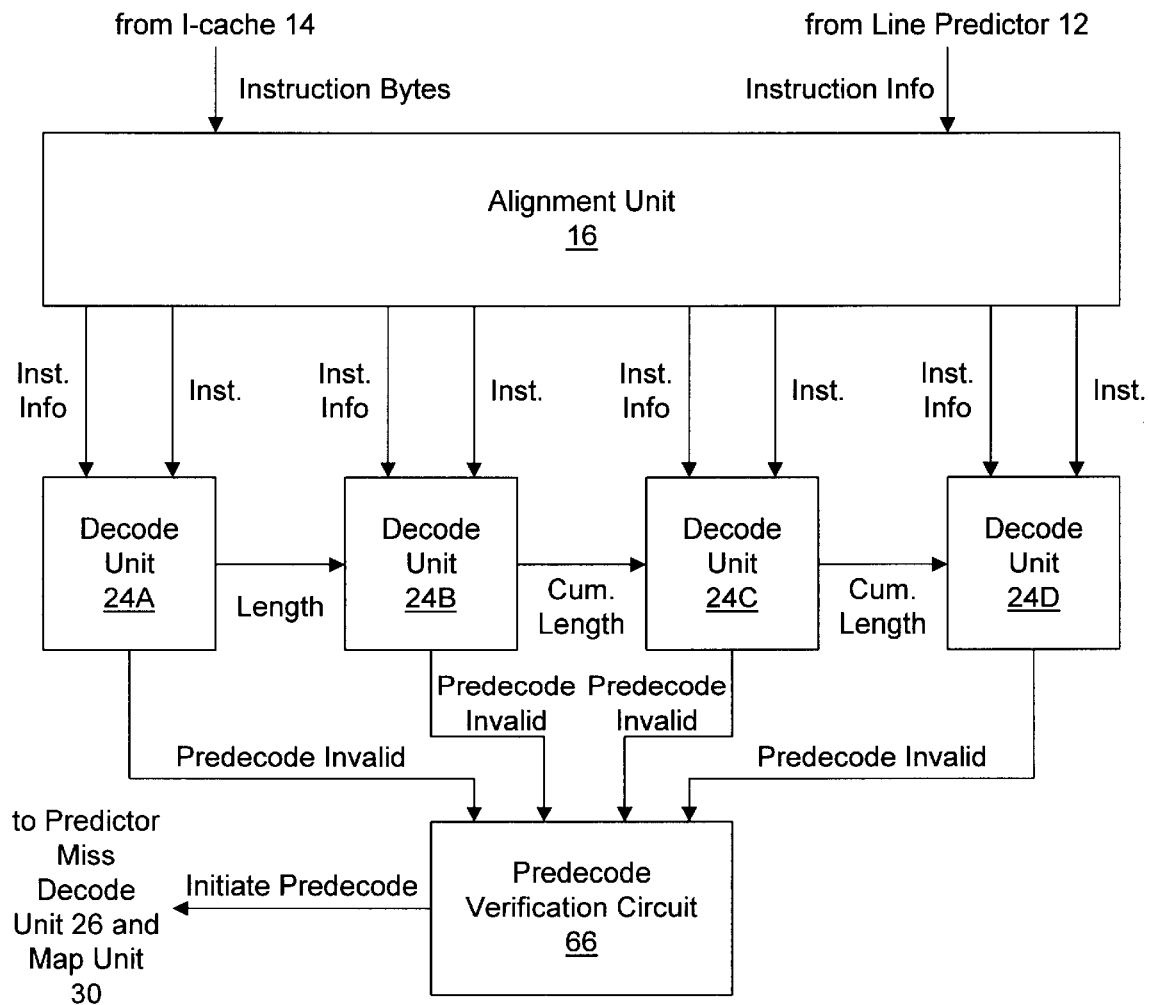
FIG. 5 is a block diagram of one embodiment of an alignment unit and decode units shown in FIG. 1 and a predecode verification circuit shown in FIG. 1.

The embodiment shown in FIGS. 4 and 5 may be a particular implementation of hardware for verifying predecode information. Line predictor 12 may be an example of a predecode cache similar to predecode cache 402, with the instruction information stored in a line predictor entry being an example of predecode information. I-cache 14 may be an example of an I-cache similar to I-cache 404. Alignment unit 16 may be an example of an alignment unit similar to alignment unit 406. Decode units 24A–24D may be an example of decode units similar to decode units 408A–408D. Predecode verification circuit 66 may be an example of a predecode verification circuit similar to predecode verification circuit 410. Predictor miss decode unit 26 may be an example of a predecoder similar to predecoder 412. Additionally, branch predictor 18A, indirect branch target cache 18B, return stack 18C, ITLB 60, and I-cache 14 may be examples of other units which update predecode information (instruction information within line predictor 12) directly.

Generally, fetch PC generation unit 18D generates a fetch address (fetch PC) for instructions to be fetched. The fetch address is provided to line predictor 12, TLB 60, and adder 62 (as well as PC silo 48, as shown in FIG. 1). Line predictor 12 compares the fetch address to fetch addresses stored therein to determine if a line predictor entry corresponding to the fetch address exists within line predictor 12. If a corresponding line predictor entry is found, the instruction pointers stored in the line predictor entry are provided to alignment unit 16 (as well as other instruction information within the line predictor entry for verification by decode units 24A–24D). In parallel with line predictor 12 searching the line predictor entries, ITLB 60 translates the fetch address (which is a virtual address in the present embodiment) to a physical address (physical PC) for access to I-cache 14. ITLB 60 provides the physical address to fetch address mux 64, and fetch PC generation unit 18D controls mux 64 to select the physical address. I-cache 14 reads instruction bytes corresponding to the physical address and provides the instruction bytes to alignment unit 16.

In the present embodiment, each line predictor entry also provides a next fetch address (next fetch PC). The next fetch address is provided to mux 64, and fetch PC generation unit 18D selects the address through mux 64 to access I-cache 14 in response to line predictor 12 detecting a hit. In this manner, the next fetch address may be more rapidly provided to I-cache 14 as long as the fetch addresses continue to hit in the line predictor. The line predictor entry may also include an indication of the next line predictor entry within line predictor 12 (corresponding to the next fetch address) to allow line predictor 12 to fetch the line predictor entry corresponding to the next fetch address. Accordingly, as long as fetch addresses continue to hit in line predictor 12, fetching of lines of instructions may be initiated from the line predictor stage of the pipeline shown in FIG. 2. Traps initiated by PC silo 48 (in response to scheduler 36), a disagreement between the prediction made by line predictor 12 for the next fetch address and the next fetch address generated by fetch PC generation unit 18D (described below) and page crossings (described below) may cause line predictor 12 to search for the fetch address provided by fetch PC generation unit 18D, and may also cause fetch PC generation unit 18D to select the corresponding physical address provided by ITLB 60.

Even while next fetch addresses are being generated by line predictor 12 and are hitting in line predictor 12, fetch PC generation unit 18D continues to generate fetch addresses for logging by PC silo 48. Additionally, the next fetch addresses may be translated by ITLB 60, which may then verify that the physical next fetch address matches the next fetch address provided by line predictor 12. More particularly, ITLB 60 may compare the next fetch address from line predictor 12 to the corresponding translated next fetch address. If a mismatch is detected, ITLB 60 may provide the corrected next fetch address to line predictor 12 to update the line predictor entry including the next fetch address. Additionally, instruction bytes are fetched from I-cache 14 using the corrected next fetch address.

Furthermore, fetch PC generation unit 18D may verify the next fetch addresses provided by line predictor 12 via the branch predictors 18A–18C. The line predictor entries within line predictor 12 identify the terminating instruction within the line of instructions by type, and line predictor 12 transmits the type information to fetch PC generation unit 18D as well as the predicted direction of the terminating instruction (branch info in FIG. 4). Furthermore, for branches forming a target address via a branch displacement included within the branch instruction, line predictor 12 may provide an indication of the branch displacement. For purposes of verifying the predicted next fetch address, the terminating instruction may be a conditional branch instruction, an indirect branch instruction, or a return instruction.

If the terminating instruction is a conditional branch instruction or an indirect branch instruction, line predictor 12 generates a branch offset from the current fetch address to the branch instruction by examining the instruction pointers in the line predictor entry. The branch offset is added to the current fetch address by adder 62, and the address is provided to branch predictor 18A and indirect branch target cache 18B. Branch predictor 18A is used for conditional branches, and indirect branch target cache 18B is used for indirect branches.

Generally, branch predictor 18A is a mechanism for predicting conditional branches based on the past behavior of conditional branches. More particularly, the address of the branch instruction is used to index into a table of branch predictions (e.g., two bit saturating counters which are incremented for taken branches and decremented for not-taken branches, and the most significant bit is used as a taken/not-taken prediction). The table is updated based on past executions of conditional branch instructions, as those branch instructions are retired or become non-speculative. In one particular embodiment, two tables are used (each having 16K entries of two bit saturating counters). The tables are indexed by an exclusive OR of recent branch prediction history and the least significant bits of the branch address, and each table provides a prediction. A third table (comprising 4K entries of two bit saturating selector counters) stores a selector between the two tables, and is indexed by the branch address directly. The selector picks one of the predictions provided by the two tables as the prediction for the conditional branch instruction. The third table may be updated according to each execution of a branch instruction. The entry in the third table indexed by the branch instruction may store a two bit saturating counter which may be incremented if the branch is taken and decremented if the branch is not taken. Other embodiments may employ different configurations and different numbers of entries. Using the three table structure, aliasing of branches having the same branch history and least significant address bits (but different most significant address bits) may be alleviated.

In response to the address provided by adder 62, branch predictor 18A provides a branch prediction. Fetch PC generation unit 18D compares the prediction to the prediction recorded in the line predictor entry. If the predictions do not match, fetch PC generation unit 18D signals (via status lines shown in FIG. 4) line predictor 12. Additionally, fetch PC generation unit 18D generates a fetch address based on the prediction from branch predictor 18A (either the branch target address generated in response to the branch displacement, or the sequential address). More particularly, the branch target address in the x86 instruction set architecture may be generated by adding the sequential address and the branch displacement. Other instruction set architectures may add the address of the branch instruction to the branch displacement.

In one embodiment, line predictor 12 stores a next alternate fetch address (and alternate indication of the next line predictor entry) in each line predictor entry. If fetch PC generation unit 18D signals a mismatch between the prediction recorded in a particular line predictor entry and the prediction from branch predictor 18A, line predictor 12 may swap the next fetch address and next alternate fetch address. In this manner, the line predictor entry may be updated to reflect the actual execution of branch instructions (recorded in branch predictor 18A). The line predictor is thereby trained to match recent branch behavior, without requiring that the line predictor entries be directly updated in response to branch instruction execution.

Indirect branch target cache 18B is used for indirect branch instructions. While branch instructions which form a target address from the branch displacement have static branch target addresses (at least at the virtual stage, although page mappings to physical addresses may be changed), indirect branch instructions have variable target addresses based on register and/or memory operands. Indirect branch target cache 18B caches previously generated indirect branch target addresses in a table indexed by branch instruction address. Similar to branch predictor 18A, indirect branch target cache 18B is updated with actually generated (during execution) indirect branch target addresses upon the retirement of indirect branch target instructions. In one particular embodiment, indirect branch target cache 18B may comprise a branch target buffer having 128 entries, indexed by the least significant bits of the indirect branch instruction address, a second table having 512 entries indexed by the exclusive-OR of the least significant bits of the indirect branch instruction address (bits inverted) and least significant bits of the four indirect branch target addresses most recently predicted using the second table. The branch target buffer output is used until it mispredicts, then the second table is used until it mispredicts, etc. This structure may predict indirect branch target addresses which do not change during execution using the branch target buffer, while using the second table to predict addresses which do change during execution.

Fetch PC generation unit 18D receives the predicted indirect branch target address from indirect branch target cache 18B, and compares the indirect branch target address to the next fetch address generated by line predictor 12. If the addresses do not match (and the corresponding line predictor entry is terminated by an indirect branch instruction), fetch PC generation unit 18D signals line predictor 12 (via the status lines) that a mismatched indirect branch target has been detected. Additionally, the predicted indirect target address from indirect branch target cache 18B is generated as the fetch address by fetch PC generation unit 18D. Line predictor 12 compares the fetch address to fetch addresses stored therein to detect a hit and select a line predictor entry. I-cache 14 (through ITLB 60) fetches the instruction bytes corresponding to the fetch address. It is noted that, in one embodiment, indirect branch target cache 18B stores linear addresses and the next fetch address generated by line predictor 12 is a physical address. However, indirect branch instructions may be unconditional in such an embodiment, and the next alternate fetch address field (which is not needed to store an alternate fetch address since the branch is unconditional) may be used to store the linear address corresponding to the next fetch address for comparison purposes.

Return stack 18C is used to predict target addresses for return instructions. As call instructions are fetched, the sequential address to the call instruction is pushed onto the return stack as a return address. As return instructions are fetched, the most recent return address is popped from the return stack and is used as the return address for that return instruction. Accordingly, if a line predictor entry is terminated by a return instruction, fetch PC generation unit 18D compares the next fetch address from the line predictor entry to the return address provided by return address stack 18C. Similar to the indirect target cache discussion above, if the return address and the next fetch address mismatch, fetch PC generation unit 18D signals line predictor 12 (via the status lines) and generates the return address as the fetch address. The fetch address is searched in line predictor 12 (and translated by ITLB 60 for fetching in I-cache 14).

The above described mechanism may allow for rapid generation of fetch addresses using line predictor 12, with parallel verification of the predicted instruction stream using the branch predictors 18A–18C. If the branch predictors 18A–18C and line predictor 12 agree, then rapid instruction fetching continues. If disagreement is detected, fetch PC generation unit 18D and line predictor 12 may update the affected line predictor entries locally.

On the other hand, certain conditions may not be detected and/or corrected by fetch PC generation unit 18D. Predictor miss decode unit 26 may detect and handle these cases. More particularly, predictor miss decode unit 26 may decode instruction bytes when a miss is detected in line predictor 12 for a fetch address generated by fetch PC generation unit 18D, when the next line predictor entry indication within a line predictor is invalid, or when the decode units 24A–24D detect that instruction information from the line predictor entry is not valid. For the next line predictor indication being invalid, predictor miss decode unit 26 may provide the next fetch address as a search address to line predictor 12. If the next fetch address hits, an indication of the corresponding line predictor entry may be recorded as the next line predictor entry indication. Otherwise, predictor miss decode unit 26 decodes the corresponding instruction bytes (received from alignment unit 12) and generates a line predictor entry for the instructions. Predictor miss decode unit 26 communicates with fetch PC generation unit 18D (via the line predictor update bus shown in FIG. 4) during the generation of line predictor entries.

More particularly, predictor miss decode unit 26 may be configured to access the branch predictors 18A–18C when terminating a line predictor entry with a branch instruction. In the present embodiment, predictor miss decode unit 26 may provide the address of the branch instruction to fetch PC generation unit 18D, which may provide the address as the fetch PC but cancel access to line predictor 12 and ITLB 60. In this manner, the address of the branch instruction may be provided through adder 62 (with a branch offset of zero) to branch predictor 18A and indirect branch target cache 18B). Alternatively, predictor miss decode unit 26 may directly access branch predictors 18A–18D rather than providing the branch instruction address to fetch PC generation unit 18D. The corresponding prediction information may be received by predictor miss decode unit 26 to generate next fetch address information for the generated line predictor entry. For example, if the line predictor entry is terminated by a conditional branch instruction, predictor miss decode unit 26 may use the branch prediction provided by branch predictor 18A to determine whether to use the branch target address or the sequential address as the next fetch address. The next fetch address may be received from indirect branch target cache 18B and may be used as the next fetch address if the line is terminated by an indirect branch instruction. The return address may be used (and popped from return stack 18C) if the line is terminated by a return instruction.

Once the next fetch address is determined for a line predictor entry, predictor miss decode unit 26 may search line predictor 12 for the next fetch address. If a hit is detected, the hitting line predictor entry is recorded for the newly created line predictor entry and predictor miss decode unit 26 may update line predictor 12 with the new entry. If a miss is detected, the next entry to be replaced in line predictor 12 may be recorded in the new entry and predictor miss decode unit 26 may update line predictor 12. In the case of a miss, predictor miss decode unit 26 may continue to decode instructions and generate line predictor entries until a hit in line predictor 12 is detected. In one embodiment, line predictor 12 may employ a first-in, first-out replacement policy for line predictor entries, although any suitable replacement scheme may be used.

It is noted that, in one embodiment, I-cache 14 may provide a fixed number of instruction bytes per instruction fetch, beginning with the instruction byte located by the fetch address. Since a fetch address may locate a byte anywhere within a cache line, I-cache 14 may access two cache lines in response to the fetch address (the cache line indexed by the fetch address, and a cache line at the next index in the cache). Other embodiments may limit the number of instruction bytes provided to up to a fixed number or the end of the cache line, whichever comes first. In one embodiment, the fixed number is 16 although other embodiments may use a fixed number greater or less than 16. Furthermore, in one embodiment, I-cache 14 is set-associative. Set-associative caches provide a number of possible storage locations for a cache line identified by a particular address. Each possible storage location is a "way" of the set-associative cache. For example, in one embodiment, I-cache 14 may be 4 way set-associative and hence a particular cache line may be stored in one of 4 possible storage locations. Set-associative caches thus use two input values (an index derived from the fetch address and a way determined by comparing tags in the cache to the remaining portion of the fetch address) to provide output bytes. Rather than await the completion of tag comparisons to determine the way, line predictor 12 may store a way prediction in the line predictor entry (provided to I-cache 14 as the way prediction shown in FIG. 4). The predicted way may be selected as the output, and the predicted way may be subsequently verified via the tag comparisons. If the predicted way is incorrect, I-cache 14 may search the other ways for a hit. The hitting way may then be recorded in line predictor 12. Way prediction may also allow for power savings by only activating the portion of the I-cache memory comprising the predicted way (and leaving the remaining memory corresponding to the unpredicted ways idle). For embodiments in which two cache lines are accessed to provide the fixed number of bytes, two way predictions may be provided by line predictor 12 for each fetch address.

As used herein, an "address" is a value which identifies a byte within a memory system to which processor 10 is couplable. A "fetch address" is an address used to fetch instruction bytes to be executed as instructions within processor 10. As mentioned above, processor 10 may employ an address translation mechanism in which virtual addresses (generated in response to the operands of instructions) are translated to physical addresses (which physically identify locations in the memory system). In the x86 instruction set architecture, virtual addresses may be linear addresses generated according to a segmentation mechanism operating upon logical addresses generated from operands of the instructions. Other instruction set architectures may define the virtual address differently.

Turning now to FIG. 5, a block diagram illustrating alignment unit 16, decode units 24A–24D, and predecode verification circuit 66 is shown. Alignment unit 16 is coupled to receive instruction bytes from I-cache 14 and instruction information from line predictor 12, and is coupled to provide a potential instruction (Inst. in FIG. 5) and instruction information (Inst. Info in FIG. 5) to each decode unit 24A–24D. Decode units 24A–24D are coupled to each other in series as shown in FIG. 5, and are coupled to provide predecode invalid signals to predecode verification circuit 66. Predecode verification circuit 66 is coupled to predictor miss decode unit 26 and to map unit 30.

Generally, alignment unit 16 aligns a potential instruction to each of decode units 24A–24D based on the instruction information provided by line predictor 12. If the instruction information does not indicate an instruction for a particular decode unit 24A–24D, that decode unit is idle for that line of instructions and does not assert its predecode invalid signal. Other decode units 24A–24D decode the instruction provided and verify the instruction information provided to that decode unit 24A–24D. If the instruction information is correct, then the decode unit 24A–24D deasserts the predecode invalid signal. If the instruction information is incorrect, than the decode unit 24A–24D asserts the predecode invalid signal.

A decode unit 24A–24D determines that the instruction information is incorrect based on a variety of reasons. First, if the potential instruction (a portion of the instruction bytes received by alignment unit 16 which is identified as an instruction by the concurrently received instruction information) is an invalid instruction, the decode unit 24A–24D determines that the instruction information is incorrect.

Additionally, even if the potential instruction is valid, the potential instruction may not succeed the preceding instruction within the instruction bytes (i.e. there may be one or more bytes between the end of the preceding instruction and the beginning of the instruction decoded by the decode unit 24A–24D). In order to detect this situation, decode units 24A–24D provide a cumulative length of the valid instructions decoded within the instruction bytes. More particularly, decode unit 24A receives the first instruction in program order within the instruction bytes; decode unit 24B receives the second instruction in program order within the instruction bytes; decode unit 24C receives the third instruction in program order within the instruction bytes; and decode unit 24D receives the fourth instruction in program order within the instruction bytes. In one embodiment, the predecode information includes an offset from the first instruction byte to the second, third, and fourth instructions. Accordingly, decode unit 24A provides the length of the decoded instruction to decode unit 24B, which compares the length to the provided offset. The offset should equal the length if the instruction decoded by decode unit 24B succeeds the instruction decoded by decode unit 24B. Decode unit 24B, if it decodes a valid instruction, adds the length of the decoded instruction to the length provided by decode unit 24A to generate a cumulative length of the two instructions. Decode unit 24B provides the cumulative length to decode unit 24C, which similarly verifies that the instruction received by decode unit 24C succeeds the instruction decoded by decode unit 24B and generates another cumulative length, etc.

The check to ensure that each instruction succeeds the preceding instruction detects the situation in which the instruction information does not correspond to the instruction bytes, but the byte pointed to by each instruction pointer (and possibly one or more subsequent bytes) decodes as a valid instruction. It is noted that, as an alternative to propagating cumulative lengths as shown in FIG. 5, alignment unit 16 may calculate an expected length for each instruction from the instruction pointers and each decode unit 24A–24D may verify that the decoded instruction is of the expected length.

Furthermore, decode units 24A–24D may receive additional attributes included in the instruction information and may verify that the additional attributes are correct. An example of instruction information, including additional attributes, is shown below.

Thus, each decode unit 24A–24D receives the instruction pointer used to align the potential instruction to that decode unit and any additional attributes that the decode unit may verify. Certain additional attributes may apply only to the terminating instruction within the line of instructions. In one embodiment, the terminating instruction is routed to decode unit 24D. Thus, decode unit 24D may receive the additional attributes which apply only to the terminating instruction and other decode units 24A–24C may not receive this information. In other embodiments, the terminating instruction may be routed to the decode unit 24A–24D which would receive the instruction (based on the number of instructions within the line) and thus the additional attributes which apply to the terminating instruction may be provided to each decode unit 24A–24D and the decode unit 24A–24D which actually receives the terminating instruction may verify the additional attributes.

Predecode verification circuit 66 receives the predecode invalid signals from decode units 24A–24D, and, if one or more of the predecode invalid signals is asserted, predecode verification circuit 66 may signal predictor miss decode unit 26 to predecode the corresponding instruction bytes. In one embodiment, decode units 24A–24D complete verification of the instruction information subsequent to completing the decode of the instructions (e.g., when the corresponding decoded instruction operations are in the M1 stage of the pipeline shown in FIG. 2). Thus, predecode verification circuit 66 may not only signal predictor miss decode unit 26 to predecode instruction bytes in response to incorrect instruction information, but may also signal one or more other units within processor 10 to discard the corresponding instruction operations as invalid. For example, map unit 30 may be signalled by predecode verification circuit 66.

It is noted that, while predecode verification circuit 66 is shown as a separate unit in FIG. 5 for clarity in the drawing, the predecode verification circuit 66 may be integrated into one of the decode units 24A–24D, predictor miss decode unit 26, or any other suitable unit. Similarly, predecode verification circuit 410 may be integrated into one of decode units 408A–408D, predecoder 412, etc.

Turning next to FIGS. 6–9, exemplary instruction information which may be stored for a line of instructions is shown. Other embodiments are possible and contemplated. The information shown may be employed in an embodiment of line predictor 12 employing two tables of information: a PC CAM and an index table. The PC CAM is a content addressable memory searched by the fetch address provided by fetch PC generation unit 18D. The PC CAM is searched by predictor miss decode unit 26 when predecode instruction bytes, and is searched using the fetch address if a trap is signalled or if an incorrect next fetch address is provided by the index table. The index table stores the line predictor entries. Once a hit in the PC CAM is detected and a line predictor entry in the index table is identified, the next line predictor entry may be identified by the current line predictor entry and the PC CAM may be idle.

Figure 6:
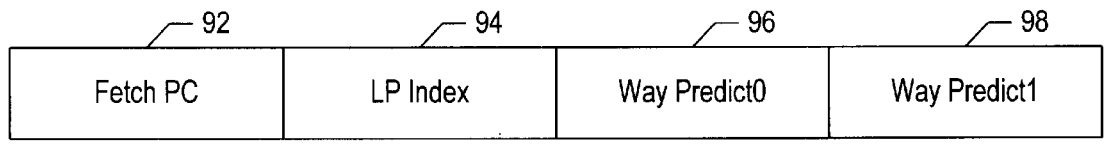
FIG. 6 is a diagram illustrating one embodiment of an entry in a PC CAM within one embodiment of the line predictor.

Turning now to FIG. 6, a diagram illustrating an exemplary entry 90 for the PC CAM of line predictor 12 is shown. Other embodiments of the PC CAM may employ entries 90 including more information, less information, or substitute information to the information shown in the embodiment of FIG. 6. In the embodiment of FIG. 6, entry 90 includes a fetch address field 92, a line predictor index field 94, a first way prediction field 96, and a second way prediction field 98.

Fetch address field 92 stores the fetch address locating the first byte for which the information in the corresponding line predictor entry is stored. The fetch address stored in fetch address field 92 may be a virtual address for comparison to fetch addresses generated by fetch PC generation unit 18D. For example, in embodiments of processor 10 employing the x86 instruction set architecture, the virtual address may be a linear address. In one embodiment, a least significant portion of the fetch address may be stored in fetch address field 92 and may be compared to fetch addresses generated by fetch PC generation unit 18D. For example, in one particular embodiment, the least significant 18 to 20 bits may be stored and compared.

A corresponding line predictor entry within index table 72 is identified by the index stored in line predictor index field 94. Furthermore, way predictions corresponding to the fetch address and the address of the next sequential cache line are stored in way prediction fields 96 and 98, respectively.

Figure 7:
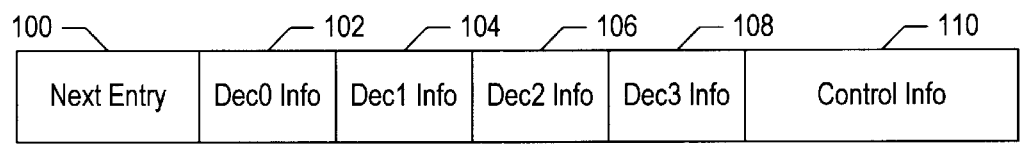
FIG. 7 is a diagram illustrating one embodiment of an entry in an Index Table within one embodiment of the line predictor.

Turning next to FIG. 7, an exemplary line predictor entry 82 which may be stored in the index table of line predictor 12 is shown. Other embodiments of index table 72 may employ entries 82 including more information, less information, or substitute information to the information shown in the embodiment of FIG. 7. In the embodiment of FIG. 7, line predictor entry 82 includes a next entry field 100, a plurality of instruction pointer fields 102–108, and a control field 110.

Figure 8:
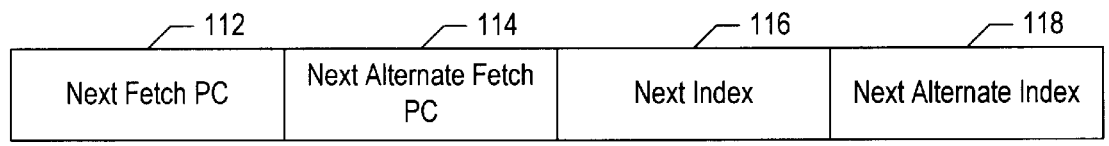
FIG. 8 is a diagram illustrating one embodiment of a next entry field shown in FIG. 7.
Figure 9:
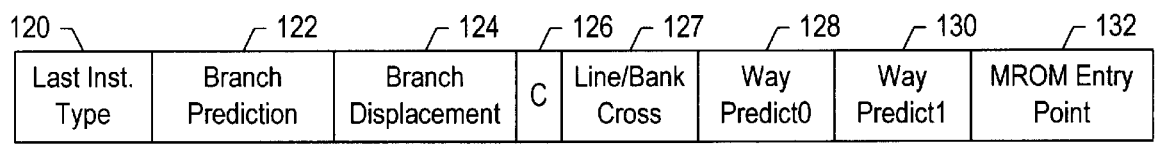
FIG. 9 is a diagram illustrating one embodiment of a control information field shown in FIG. 7.

Next entry field 100 stores information identifying the next line predictor entry to be fetched, as well as the next fetch address. One embodiment of next entry field 100 is shown below (FIG. 8). Control field 110 stores control information regarding the line of instructions, including instruction termination information and any other information which may be used with the line of instructions. One embodiment of control field 110 is illustrated in FIG. 9 below. Next entry field 100 and control field 110 may comprise additional attributes for this embodiment.

Each of instruction pointer fields 102–108 stores an instruction pointer for a corresponding decode unit 24A–24D. Accordingly, the number of instruction pointer fields 102–108 may be the same as the number of decode units provided within various embodiments of processor 10. Viewed in another way, the number of instruction pointers stored in a line predictor entry may be the maximum number of instructions which may be concurrently decoded (and processed to the schedule stage) by processor 10. Each instruction pointer field 102–108 directly locates an instruction within the instruction bytes (as opposed to predecode data, which is stored on a byte basis and must be scanned as a whole before any instructions can be located). In one embodiment, the instruction pointers may be the length of each instruction (which, when added to the address of each instruction, locates the next instruction). A length of zero may indicate that the next instruction is invalid. Alternatively, the instruction pointers may comprise offsets from the fetch address (and a valid bit to indicate validity of the pointer). In one specific embodiment, instruction pointer 102 (which locates the first instruction within the instruction bytes) may comprise a length of the instruction, and the remaining instruction pointers may comprise offsets and valid bits. Each decode unit 24A–24D verifies the instruction pointer of the corresponding instruction, as described above.

In one embodiment, microcode unit 28 is coupled only to decode unit 24D (which corresponds to instruction pointer field 108). In such an embodiment, if a line predictor entry includes a microcode (or MROM) instruction, the MROM instruction is located by instruction pointer field 108. If the line of instructions includes fewer than the maximum number of instructions, the MROM instruction is located by instruction pointer field 108 and one or more of the instruction pointer fields 102–106 are invalid. Alternatively, the MROM instruction may be located by the appropriate instruction pointer field 102–108 based on the number of instructions in the line, and the type field 120 (shown below) may indicate that the last instruction is an MROM instruction and thus is to be aligned to decode unit 24D.

Turning now to FIG. 8, an exemplary next entry field 100 is shown. Other embodiments of next entry field 100 may employ more information, less information, or substitute information to the information shown in the embodiment of FIG. 8. In the embodiment of FIG. 8, next entry field 100 comprises a next fetch address field 112, a next alternate fetch address field 114, a next index field 116, and a next alternate index field 118.

Next fetch address field 112 stores the next fetch address for the line predictor entry. The next fetch address is the address of the next instructions to be fetched after the line of instructions in the current entry, according to the branch prediction stored in the line predictor entry. For lines not terminated with a branch instruction, the next fetch address may be the sequential address to the terminating instruction. The next index field 116 stores the index within index table 72 of the line predictor entry corresponding to the next fetch address (i.e. the line predictor entry storing instruction pointers for the instructions fetched in response to the next fetch address). The next fetch address is verified by fetch PC generation unit 18D and ITLB 60, in combination, as described above.

Next alternate fetch address field 114 (and the corresponding next alternate index field 118) are used for lines which are terminated by branch instructions (particularly conditional branch instructions). The fetch address (and corresponding line predictor entry) of the non-predicted path for the branch instruction are stored in the next alternate fetch address field 114 (and the next alternate index field 118). In this manner, if the branch predictor 18A disagrees with the most recent prediction by line predictor 12 for a conditional branch, the alternate path may be rapidly fetched (e.g. without resorting to predictor miss decode unit 26). Accordingly, if the branch is predicted taken, the branch target address is stored in next fetch address field 112 and the sequential address is stored in next alternate fetch address field 114. On the other hand, if the branch is predicted not taken, the sequential address is stored in next fetch address field 112 and the branch target address is stored in next alternate fetch address field 114. Corresponding next indexes are stored as well in fields 116 and 118.

In one embodiment, next fetch address field 112 and next alternate fetch address field 114 store physical addresses for addressing I-cache 14. In this manner, the time used to perform a virtual to physical address translation may be avoided as lines of instructions are fetched from line predictor 12. Other embodiments may employ virtual addresses in these fields and perform the translations (or employ a virtually tagged cache). It is noted that, in embodiments employing a single memory within line predictor 12 (instead of the PC CAM and index table), the index fields may be eliminated since the fetch addresses are searched in the line predictor. It is noted that the next fetch address and the next alternate fetch address may be a portion of the fetch address. For example, the in-page portions of the addresses may be stored (e.g. the least significant 12 bits) and the full address may be formed by concatenating the current page to the stored portion. It is noted that the next entry information may generally be verified by the branch prediction hardware (e.g. units 18A–18D in FIG. 4).

Turning next to FIG. 9, an exemplary control field 110 is shown. Other embodiments of control field 110 may employ more information, less information, or substitute information to the information shown in the embodiment of FIG. 9. In the embodiment of FIG. 9, control field 110 includes a last instruction type field 120, a branch prediction field 122, a branch displacement field 124, a continuation field 126, a line/bank cross field 127, a first way prediction field 128, a second way prediction field 130, and an entry point field 132.

Last instruction type field 120 stores an indication of the type of the last instruction (or terminating instruction) within the line of instructions. The type of instruction may be provided to fetch PC generation unit 18D to allow fetch PC generation unit 18D to determine which of branch predictors 18A–18C to use to verify the branch prediction within the line predictor entry. More particularly, last instruction type field 120 may include encodings indicating sequential fetch (no branch), microcode instruction, conditional branch instruction, indirect branch instruction, call instruction, and return instruction. The conditional branch instruction encoding results in branch predictor 18A being used to verify the direction of the branch prediction. The indirect branch instruction encoding results in the next fetch address being verified against indirect branch target cache 18B. The return instruction encoding results in the next fetch address being verified against return stack 18C. The last instruction type field 120 may be verified by the decode unit 24A–24D receiving the terminating instruction.

Branch prediction field 122 stores the branch prediction recorded by line predictor 12 for the branch instruction terminating the line (if any). Generally, fetch PC generation unit 18D verifies that the branch prediction in field 122 matches (in terms of taken/not taken) the prediction from branch predictor 18A. In one embodiment, branch prediction field 122 may comprise a bit with one binary state of the bit indicating taken (e.g. binary one) and the other binary state indicating not taken (e.g. binary zero). If the prediction disagrees with branch predictor 122, the prediction may be switched. In another embodiment, branch prediction field 122 may comprise a saturating counter with the binary state of the most significant bit indicating taken/not taken. If the taken/not taken prediction disagrees with the prediction from branch predictor 18A, the saturating counter is adjusted by one in the direction of the prediction from branch predictor 18A (e.g. incremented if taken, decremented if not taken). The saturating counter embodiment may more accurately predict loop instructions, for example, in which each N-1 taken iterations (where N is the loop count) is followed by one not taken iteration.

Branch displacement field 124 stores an indication of the branch displacement corresponding to a direct branch instruction. In one embodiment, branch displacement field 124 may comprise an offset from the fetch address to the first byte of the branch displacement. Fetch PC generation unit 18D may use the offset to locate the branch displacement within the fetched instruction bytes, and hence may be used to select the displacement from the fetched instruction bytes. In another embodiment, the branch displacement may be stored in branch displacement field 124, which may be directly used to determine the branch target address. Branch displacement field 124 may be verified by the decode unit 24A–24D receiving the branch instruction.

In the present embodiment, the instruction bytes represented by a line predictor entry may be fetched from two consecutive cache lines of instruction bytes. Accordingly, one or more bytes may be in a different page than the other instruction bytes. Continuation field 126 is used to signal the page crossing, so that the fetch address corresponding to the second cache line may be generated and translated. Once a new page mapping is available, other fetches within the page have the correct physical address as well. The instruction bytes in the second page are then fetched and merged with the instruction bytes within the first page. Continuation field 126 may comprise a bit indicative, in one binary state, that the line of instructions crosses a page boundary, and indicative, in the other binary state, that the line of instructions does not cross a page boundary. Continuation field 126 may also be used to signal a branch target address which is in a different page than the branch instruction.

To conserve power, I-cache 14 may be configured to access only the tag for the first cache line if the fetched instruction bytes do not cross a cache line boundary. Additionally, I-cache 14 may organize the instruction bytes memory as a set of banks, and may access only the bank including the instruction bytes if instruction bytes are included within one bank. The other tags/banks may be idle, and thus not consume power. Line/Bank cross field 127 may store indications of whether the instruction bytes cross a cache line boundary and/or a bank boundary. The line and bank indications may be verified by I-cache 14 and may be updated directly into line predictor 12 if incorrect. Alternatively, the line and bank indications may be verified by decode units 24A–24D.

Similar to way prediction fields 96 and 98, way prediction fields 128 and 130 store the way predictions corresponding to the next fetch address (and the sequential address to the next fetch address). Way predictions may be verified by I-cache 14, and updated directly into entry 90 or 82. Finally, entry point field 132 may store an entry point for a microcode instruction within the line of instructions (if any). An entry point for microcode instructions is the first address within the microcode ROM at which the microcode routine corresponding to the microcode instruction is stored. If the line of instructions includes a microcode instruction, entry point field 132 stores the entry point for the instruction. The time used to decode the microcode instruction to determine the entry point may be eliminated during the fetch and dispatch of the instruction, allowing for the microcode routine to be entered more rapidly. The stored entry point may be verified against an entry point generated in response to the instruction (by decode unit 24D or MROM unit 28). It is noted that, in one embodiment in which both branch instructions and microcode instructions are terminating conditions for a line, branch displacement field 124 and entry point field 132 may be overlapped.

Figure 10:
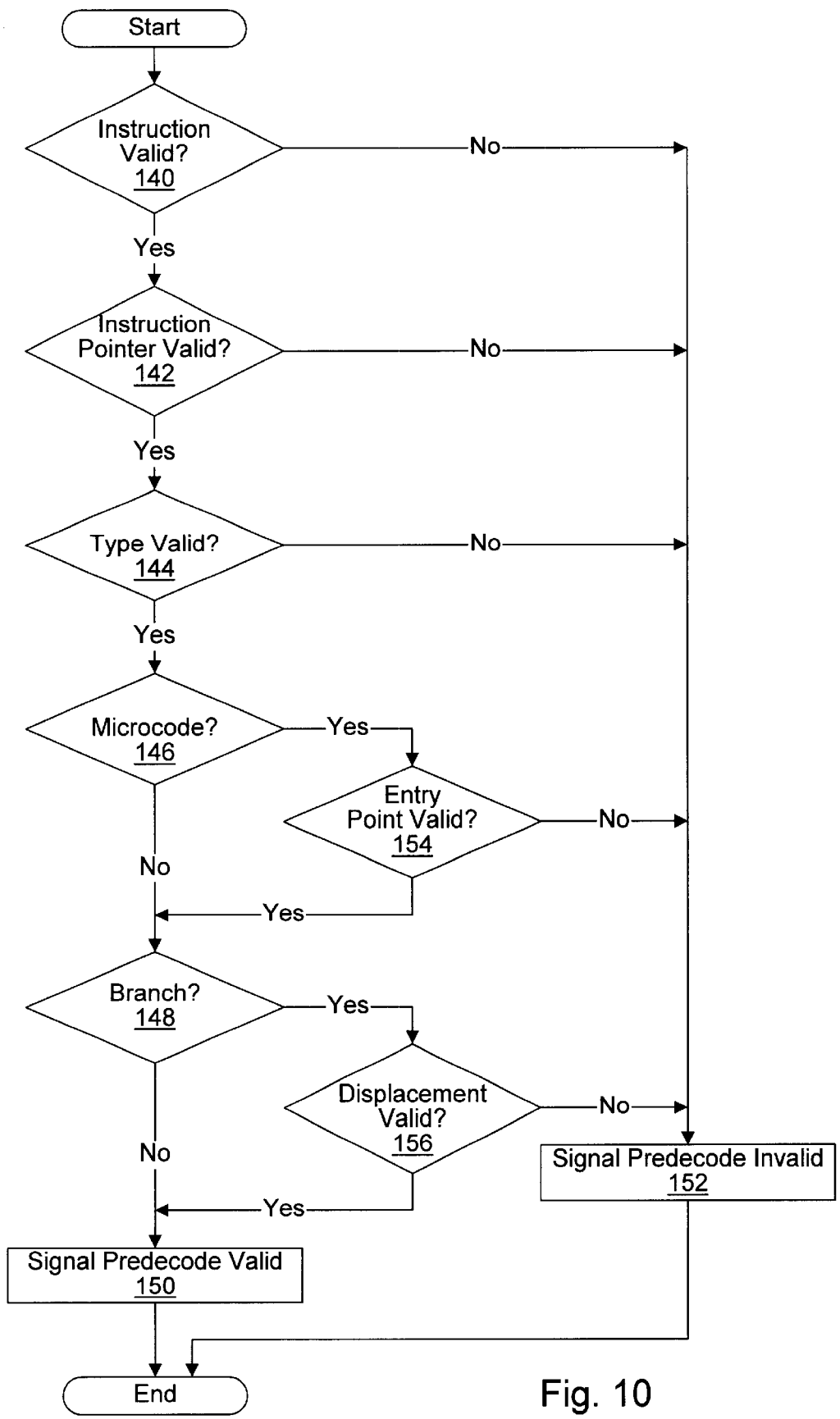
FIG. 10 is a flowchart illustrating one embodiment of a decode unit verifying predecode information.

Turning next to FIG. 10, a flowchart is shown illustrating the operation of decode units 24A–24D for validating instruction information as illustrated in FIGS. 6–9. Other embodiments are possible and contemplated. Although illustrated in a serial order for ease of understanding, the steps shown in FIG. 10 may be performed in any suitable order and/or may be performed in parallel by the combinatorial logic within the decode units. Particularly, decision blocks 140, 142, 144, 146, and 148 may be performed in parallel or in any desired order.

The decode unit decodes the received instruction bytes and determines if the instruction is valid (decision block 140). If the instruction is invalid, the decode unit signals that the predecode data is invalid (step 152). The decode unit also determines if the instruction pointer is valid (e.g. that the instruction pointer points to an instruction byte which succeeds the preceding instruction in program order—decision block 142). If the instruction pointer is invalid, the decode unit signals that the predecode data is invalid (step 152). If the instruction received by the decode unit is the terminating instruction within the line of instructions, the decode unit verifies that the instruction type from instruction type field 120 matches the instruction type of the decoded instruction (decision block 144). If the instruction type does not match, the decode unit signals that the predecode data is invalid (step 152). The decode unit determines if the instruction is a microcode instruction (decision block 146), and generates an entry point for the instruction if the instruction is a microcode instruction. The generated entry point is compared to the entry point from the line predictor entry (decision block 154), and if the entry points do not match, the decode unit signals that the predecode data is invalid (step 152). The decode unit also determines if the instruction is a branch instruction (decision block 148), and verifies the branch displacement indication from the line predictor entry if the instruction is a branch instruction (decision block 156). If the branch displacement indication is invalid, then the decode unit signals that the predecode data is invalid (step 152). If none of the verification checks results in a signalling that the predecode data is invalid, the decode unit signals that the predecode data is valid (step 150).

It is noted that, in embodiments in which the terminating instruction is routed to decode unit 24D only, decode units 24A–24C may be configured to perform only decision blocks 140 and 142 and step 152, while decode unit 24D may perform each of the checks shown in the flowchart.

Figure 11:
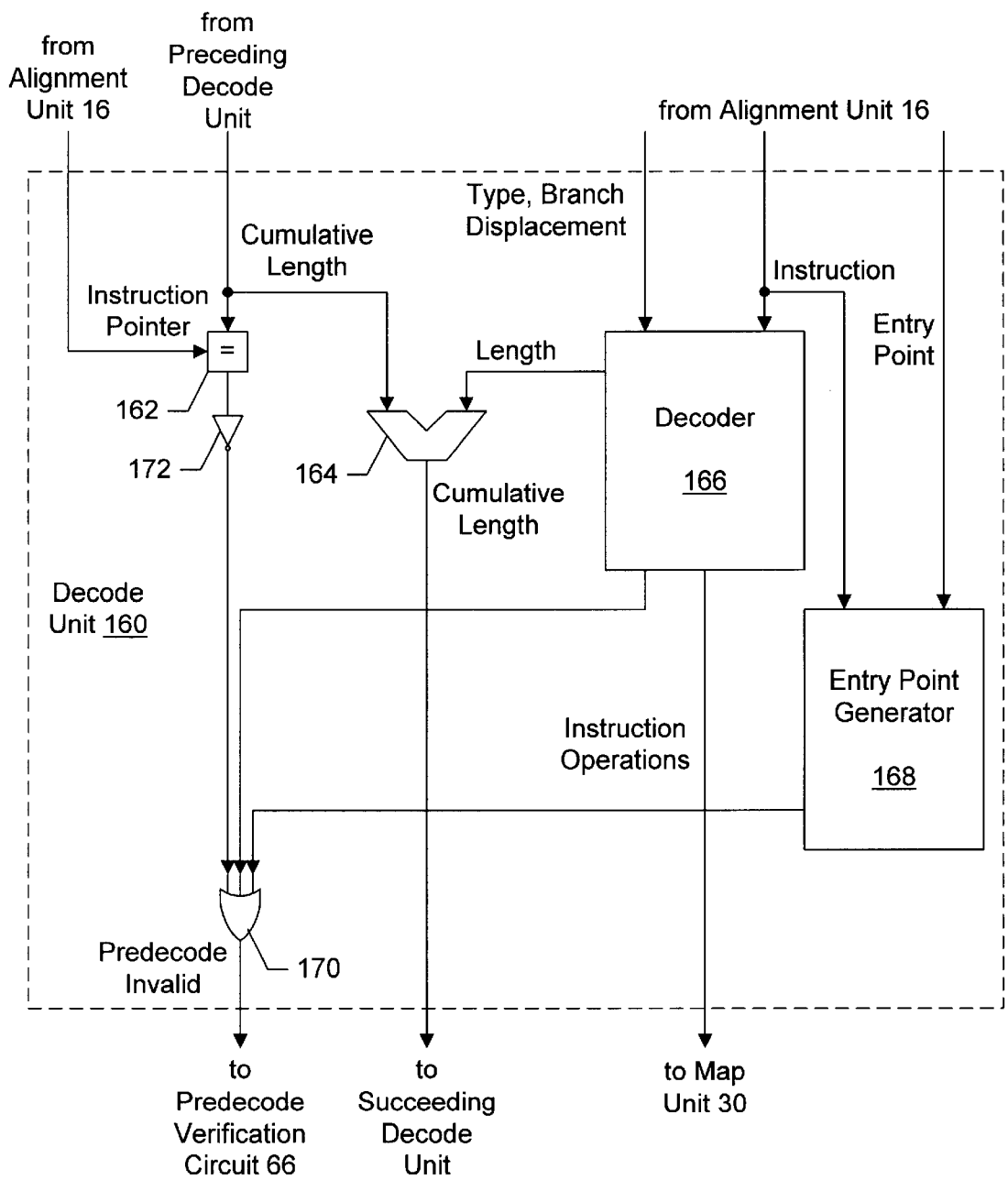
FIG. 11 is a block diagram of one embodiment of an exemplary decode unit.

Turning next to FIG. 11, a block diagram of an exemplary decode unit 160 is shown. Other embodiments are possible and contemplated, including Boolean equivalents of the combinatorial logic circuits shown in FIG. 11. In the embodiment of FIG. 11, decode unit 160 includes a comparator 162, an adder 164, a decoder 166, an entry point generator 168, an OR gate 170, and an inverter 172. Comparator 162 is coupled to receive an instruction pointer from alignment unit 16 and a cumulative length from a preceding decode unit, and is further coupled through inverter 172 to OR gate 170. Adder circuit 164 is coupled to receive the cumulative length and a length from decoder 166, and is coupled to provide a cumulative length to a succeeding decode unit. Decoder 166 is coupled to receive an instruction type, a branch displacement indication, and an instruction from alignment unit 16, and is further coupled to OR gate 170 and to provide instruction operations to map unit 30. Entry point generator 168 is coupled to receive the instruction and an entry point from alignment unit 16 and is coupled to OR gate 170.

Comparator 162 compares the instruction pointer used by alignment unit 16 to align the instruction to decode unit 160 to the cumulative length received from the preceding decode unit (i.e. the decode unit which decodes the instruction preceding the instruction decoded by decode unit 160). If the cumulative length matches the instruction pointer, then the instruction pointer is verified as correct. If a mismatch is detected, the instruction pointer is incorrect and the predecode invalid signal is to be asserted. Since comparator 162 asserts its output in response to detecting a match, inverter 172 is provided to invert the output of comparator 162 to provide an input to OR gate 170. Thus, a mismatch detected by comparator 162 results in an assertion of the predecode invalid signal (which is the output of OR gate 170). Since decode unit 24A receives the first instruction, there is no cumulative length to compare against. Accordingly, decode unit 24A may omit comparator 162. Other decode units 24B–24D may include circuitry similar to comparator 162.

Adder 164 adds the cumulative length received from the preceding decode unit to the length of the instruction decoded by decoder 166 to produce a new cumulative length for the succeeding decode unit (i.e. the decode unit which decodes the instruction succeeding the instruction decoded by decode unit 160). Since decode unit 24D in the above embodiment does not have a succeeding decode unit, decode unit 24D may omit adder 164. Additionally, since decode unit 24A does not receive a cumulative length, decode unit 24A may omit adder 164 and provide the length detected by decoder 166 as the cumulative length. Decode units 24B–24C may include circuitry similar to adder 164.

Decoder 166 decodes the received instruction and provides instruction operations to map unit 30 in response to the received instruction. If the received instruction is invalid, decoder 166 asserts an output signal to OR gate 170, causing assertion of the predecode invalid signal. Additionally, decoder 166 verifies the last instruction type and branch displacement additional attributes from the predecode data (if decoder 166 decodes the terminating instruction within the line). If either the last instruction type or the branch displacement indication are incorrect, decoder 166 asserts the output signal to OR gate 170. It is noted that, in embodiments in which decode unit 24D receives the terminating instruction, the decoder circuitry within decode units 24A–24C may decode the received instruction but may not receive instruction type or branch displacement information. In embodiments in which the terminating instruction may be provided to any decode unit 24A–24D, decode units 24A–24D may include decoder circuitry similar to decoder 166.

Entry point generator 168 decodes the received instruction to generate an entry point if the received instruction is a microcode instruction. Entry point generator 168 receives the entry point recorded in the line predictor entry, and compares that entry point to the generated entry point. If the entry points do not match, entry point generator 168 asserts an output signal to OR gate 170, causing an assertion of the predecode invalid signal. It is noted that entry point generator 168 may also provide the generated entry point to predictor miss decode unit 26 for inclusion in the corrected line predictor entry. In the present embodiment, decode unit 24D may include circuitry similar to entry point generator 168 (since decode unit 24D is coupled to microcode unit 28).

Figure 12:
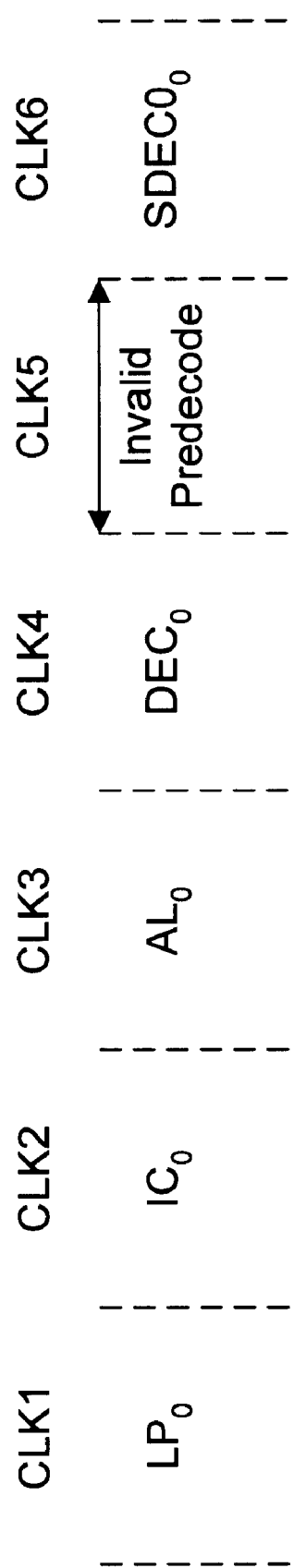
FIG. 12 is a timing diagram illustrating initiation of predecode in response to verifying that the predecode information does not match the instructions.

Turning next to FIG. 12, a timing diagram is shown illustrating the detection of invalid predecode data by decode units 24A–24D. The timing diagram illustrates a set of clock cycles delimited by vertical dashed lines, with a label for the clock cycle above and between (horizontally) the vertical dashed lines for that clock cycle. Each clock cycle will be referred to with the corresponding label. The pipeline stage labels shown in FIG. 2 are used in the timing diagram. This case may occur due to address aliasing, for example, or due to the lack of coherency maintained between the line predictor and the I-cache.

The instruction bytes and instruction information are fetched in the line predictor stage (clock cycle CLK1) and flow through the instruction cache and alignment stages (clock cycles CLK2 and CLK3). Alignment unit 16 uses the provided instruction information to align instructions to decode units 24A–24D. The decode units 24A–24D decode the provided instructions (Decode stage, clock cycle CLK4). Additionally, the decode units 24A–24D signal with an indication of whether or not the predecode data is invalid. In the present embodiment, the determination of valid or invalid predecode occurs after the decode stage is complete (e.g. clock cycle CLK5 in FIG. 12), the instruction bytes are routed to predictor miss decode unit 26, which begins predecoding the instruction bytes (clock cycle CLK6). It is noted that predictor miss decode unit 26 may speculatively begin decoding at clock cycle CLK4, if desired. It is further noted that the first instruction in the instruction bytes (decoded by decode unit 24A) is valid and may be dispatched even as predictor miss decode unit 26 decodes the remaining instructions.

Computer Systems

Figure 13:
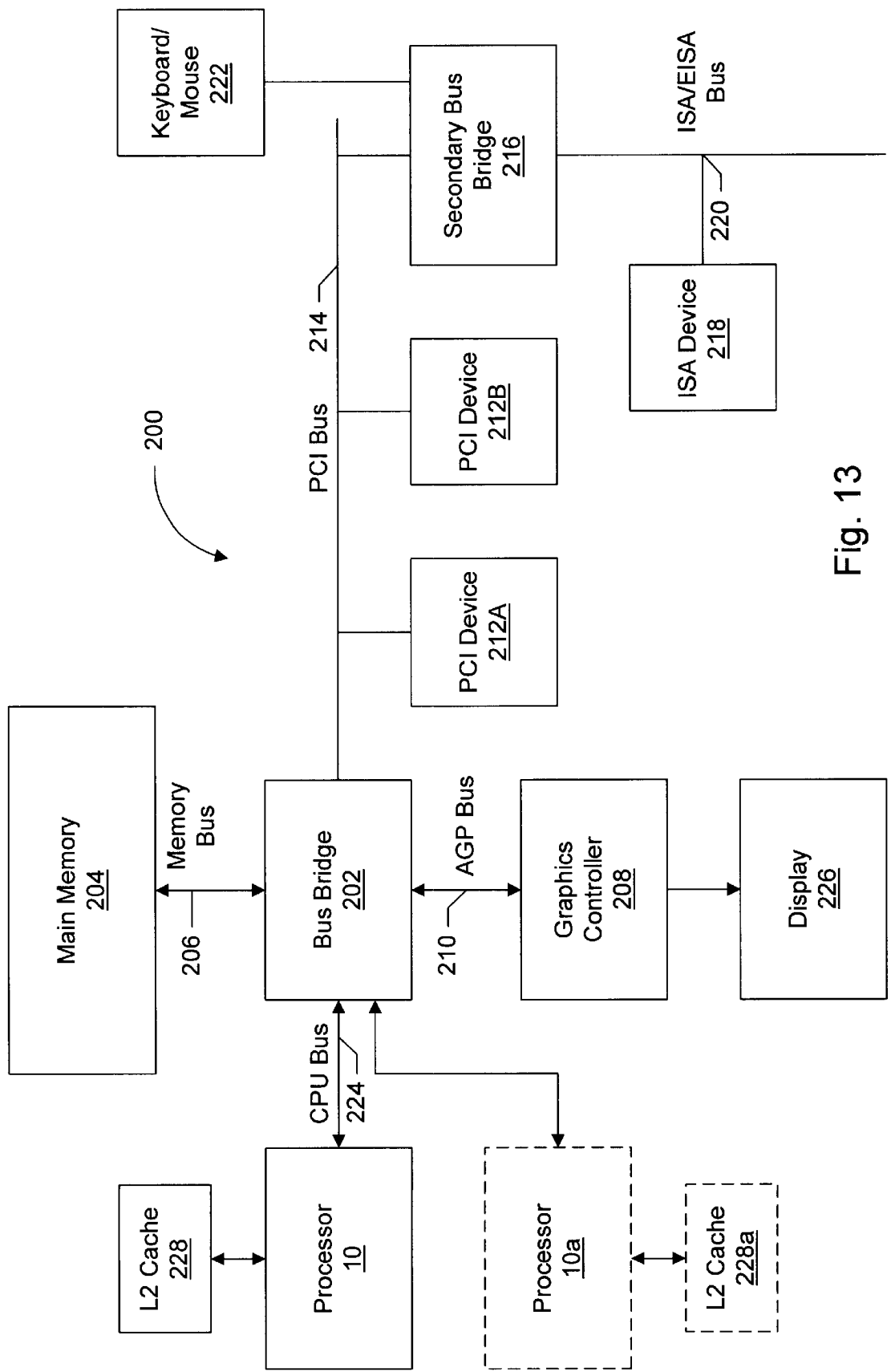
FIG. 13 is a block diagram of a first exemplary computer system including the processor shown in FIG. 1.

Turning now to FIG. 13, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 13) or may share CPU bus 224 with processor 10. Furthermore, processor 10a may be coupled to an optional L2 cache 228a similar to L2 cache 228.

Figure 14:
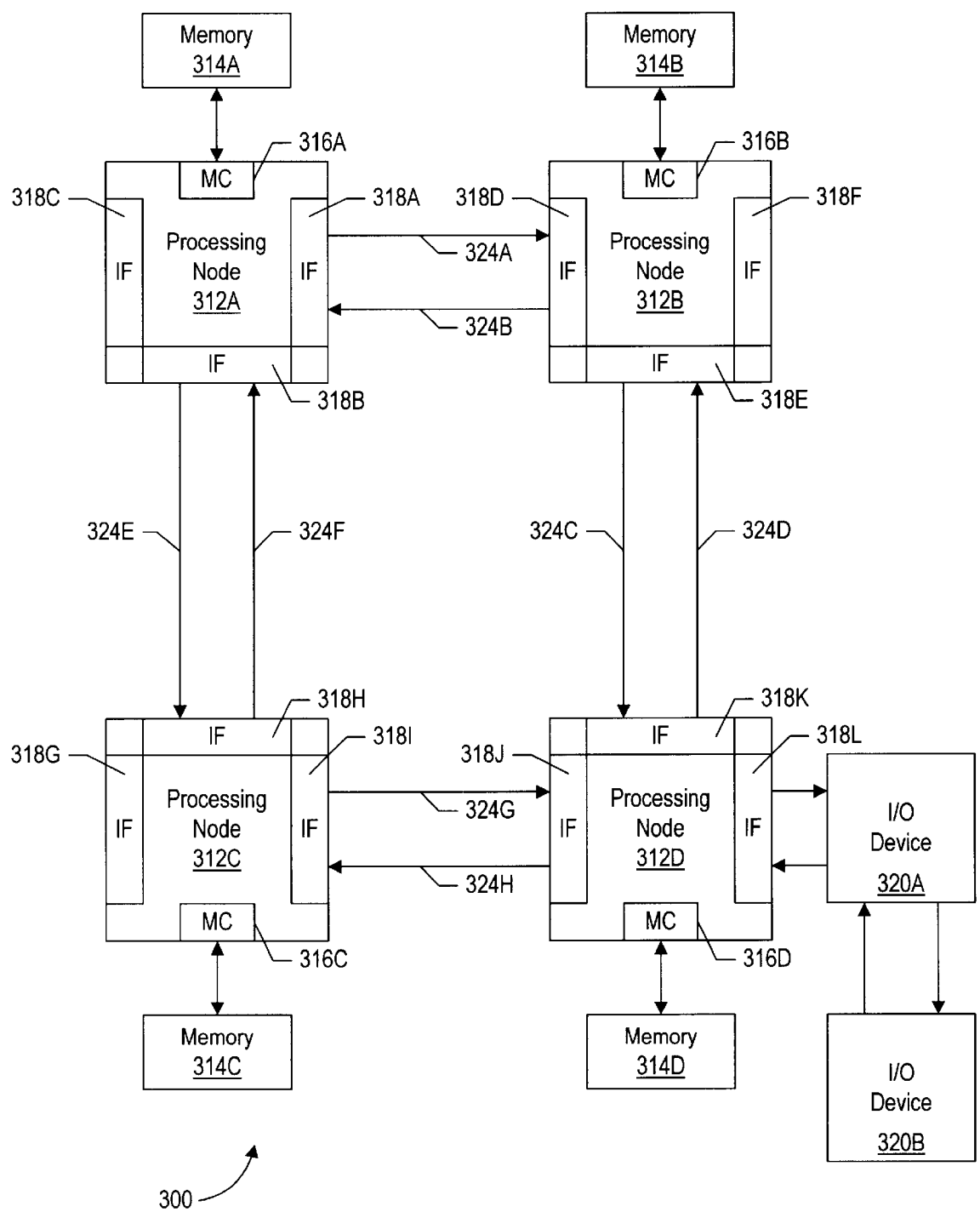
FIG. 14 is a block diagram of a second exemplary computer system including the processor shown in FIG. 1.

Turning now to FIG. 14, another embodiment of a computer system 300 is shown. Other embodiments are possible and contemplated. In the embodiment of FIG. 14, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 14. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 14. Any suitable routing algorithm may be used. Other embodiments of computer system 300 may include more or fewer processing nodes then the embodiment shown in FIG. 14.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
   a predecode cache configured to store predecode information, wherein said predecode cache is configured to output said predecode information responsive to a fetch address; and
   one or more decode units coupled to receive said predecode information, wherein each decode unit is coupled to receive a portion of a plurality of instruction bytes fetched in response to said fetch address, and wherein said each decode unit is configured to decode said portion, and wherein said one or more decode units are configured to verify that said predecode information corresponds to said plurality of instruction bytes.

2. The processor as recited in claim 1 further comprising a predecode verification circuit coupled to said one or more decode units, wherein said each decode unit is configured to signal a result of verifying said predecode information to said predecode verification circuit, and wherein said predecode verification circuit is configured to initiate predecoding if at least one of said one or more decode units indicates that said predecode information does not correspond to said plurality of instruction bytes.

3. The processor as recited in claim 2 wherein said processor is configured to dispatch instructions from said plurality of instruction bytes as said instructions are predecoded.

4. The processor as recited in claim 1 further comprising:
   a fetch PC generation unit configured to generate a virtual fetch address; and
   a translation lookaside buffer (TLB) coupled to said fetch PC generation unit, wherein said TLB is configured to translate said virtual fetch address to a physical fetch address;
   wherein said predecode information includes a physical next fetch address, and wherein said TLB is configured to verify that said next fetch address matches a corresponding physical fetch address.

5. The processor as recited in claim 1 wherein a first decode unit of said one or more decode units is configured to determine that said predecode information does not correspond to said plurality of instruction bytes if said portion is not a valid instruction.

6. The processor as recited in claim 5 further comprising an alignment unit coupled receive said predecode information and said plurality of instruction bytes, and wherein said alignment unit is configured to align said portions of said plurality of instruction bytes to said one or more decode units responsive to said predecode information, and wherein said predecode information does not correspond to said plurality of instruction bytes if said predecode information locates an instruction incorrectly within said plurality of instruction bytes.

7. The processor as recited in claim 6 wherein said predecode information comprises a plurality of instruction pointers, and wherein each of said plurality of instruction pointers points to a byte within said plurality of instruction bytes, and wherein one of said predecode information does not correspond to said plurality of instruction bytes if said byte pointed to by one of said plurality of instruction pointers does not succeed a last byte of a preceding instruction within said plurality of instruction bytes.

8. The processor as recited in claim 7 wherein first decode unit is coupled to receive an indication of said last byte of said preceding instruction from another one of said one or more decode units to determine if said byte succeeds said last byte.

9. The processor as recited in claim 1 wherein said predecode information comprises an instruction type of a last instruction identified by said predecode information, and wherein a first decode unit of said one or more decode units which receives said last instruction is configured to verify that said instruction type matches a decoded instruction type of said last instruction.

10. The processor as recited in claim 1 wherein said predecode information comprises an entry point if a microcode instruction is included in said plurality of instruction bytes, and wherein a first decode unit of said one or more decode units which receives said microcode instruction is configured to verify that said microcode instruction is included within said plurality of instruction bytes and to generate an entry point for said microcode instruction, and wherein said first decode unit is configured to verify that said entry point from said predecode information matches said entry point generated for said microcode instruction.

11. The processor as recited in claim 1 wherein said predecode information comprises a branch displacement identifier corresponding to a branch instruction within said plurality of instruction bytes, and wherein a first decode unit of said one or more decode units receiving said branch instruction is configured to verify said branch displacement identifier.

12. The processor as recited in claim 1 further comprising an instruction cache, and wherein said predecode information includes a bank crossing indication identifying whether or not said plurality of instruction bytes crosses a bank boundary within said instruction cache, and wherein said one or more decoders are configured to verify if said bank crossing indication corresponds to said plurality of instruction bytes.

13. The processor as recited in claim 1 further comprising an instruction cache, and wherein said predecode information includes a line crossing indication identifying whether or not said plurality of instruction bytes crosses a cache line boundary within said instruction cache, and wherein said one or more decoders are configured to verify if said line crossing indication corresponds to said plurality of instruction bytes.

14. A computer system comprising:
   a processor including:
      a predecode cache configured to store predecode information, wherein said predecode cache is configured to output said predecode information responsive to a fetch address; and
      one or more decode units coupled to receive said predecode information, wherein each decode unit is coupled to receive a portion of a plurality of instruction bytes fetched in response to said fetch address, and wherein said each decode unit is configured to decode said portion, and wherein said one or more decode units are configured to verify that said predecode information corresponds to said plurality of instruction bytes; and
   an input/output (I/O) device configured to communicate between said computer system and another computer system to which said I/O device is couplable.

15. The computer system as recited in claim 14 wherein said I/O device comprises a modem.

16. The computer system as recited in claim 14 further comprising an audio I/O device.

17. The computer system as recited in claim 16 wherein said audio I/O device comprises a sound card.

18. A method comprising:
   fetching predecode information from a predecode cache responsive to a fetch address;
   fetching a plurality of instruction bytes responsive to said fetch address;

decoding said plurality of instruction bytes; and verifying that said predecode information corresponds to said plurality of instruction bytes.

19. The method as recited in claim 18 further comprising locating instructions within said plurality of instruction bytes using said predecode information; and wherein said verifying comprises determining that said predecode information does not correspond to said plurality of instruction bytes if one or more of said instructions located during said locating is invalid.

20. The method as recited in claim 19 wherein said predecode information comprises a plurality of instruction pointers, and wherein each of said plurality of instruction pointers points to a byte, and wherein said verifying comprises verifying that said byte succeeds a last byte of another instruction within said plurality of instruction bytes.

21. The processor as recited in claim 5 wherein the first decode unit is configured to determine that said predecode information does not correspond to said pluality of instruction bytes if said portion is said valid instruction but one or more attributes of said valid instruction identified by said predecode information do not correspond to said valid instruction.

22. The method as recited in claim 19 wherein said verifying further comprises determining that said predecode information does not correspond to said plurality of instruction bytes if the instruction located during said locating are valid but one or more attributes of said instruction identified by said predecode information do not correspond to said valid instruction.

* * * * *